United States Patent [19]

Hagelthorn

[11] Patent Number: 4,993,746
[45] Date of Patent: Feb. 19, 1991

[54] LOCKING FRICTIONAL D-RING

[75] Inventor: James E. Hagelthorn, Farmington

[73] Assignee: Ford Motor Company, Dearborn, Mich.

[21] Appl. No.: 402,325

[22] Filed: Sep. 5, 1989

[51] Int. Cl.⁵ .............................................. B60R 22/36
[52] U.S. Cl. ............................ 280/806; 242/107.4 A; 280/801
[58] Field of Search ................ 280/801, 802, 804, 808, 280/805, 806; 242/107.4 R, 107.4 A, 107.2 A

[56] References Cited

U.S. PATENT DOCUMENTS

| | | | |
|---|---|---|---|
| 2,953,315 | 9/1960 | Lautier et al. | 242/107.4 |
| 3,410,153 | 11/1968 | Merna, Jr. | 74/530 |
| 4,109,962 | 8/1978 | Magyar | 297/385 |
| 4,286,758 | 1/1981 | Inukai et al. | 242/107 |
| 4,494,774 | 1/1985 | Fohl | 280/806 |
| 4,508,289 | 4/1985 | Singer et al. | 242/107.4 B |
| 4,616,141 | 10/1986 | Hollowell | 280/801 |
| 4,664,413 | 5/1987 | Sato | 280/801 |
| 4,667,981 | 5/1987 | Koije | 280/806 |
| 4,708,364 | 11/1987 | Doty | 280/801 |
| 4,717,088 | 1/1988 | Fohl | 242/107.2 |
| 4,985,985 | 12/1984 | Fohl | 242/107.2 |

Primary Examiner—Richard A. Bertsch
Attorney, Agent, or Firm—Daniel M. Stock; Robert L. May

[57] ABSTRACT

A guide ring is provided for an automotive seat belt system which includes a roller mounted for free rotational movement during normal guide ring operation and for frictional engagement with one side of the seat belt upon imposition of a load by the occupant in an emergency situation.

11 Claims, 6 Drawing Sheets

LOCKING FRICTIONAL D-RING

BACKGROUND OF THE INVENTION

The present invention relates generally to guide rings for automotive seat belt systems and further to emergency responsive seat belt restraining devices.

DESCRIPTION OF THE PRIOR ART

Modern automotive restraint systems utilize a D-ring as a pulley to direct the portion of the automotive seat belt which spans the occupant's torso over the occupant's shoulder to a position in which it is a tongue locked in a buckle. These D-rings differ from true pulleys in that they rely upon a smooth surface to change the direction of the seat belt webbing rather than wheels or rollers normally associated with a pulley. For optimal operation, it is necessary to provide this smooth surface in the D-ring to encourage usage of the seat belt by making the seat belt easy to don and further, to ensure that the return spring provided in the seat belt retractor of the system can return the belt to its stored position without need to overcome excessive frictional force. In the widely used three-point seat belt systems, it is customary to position the retractor at a point below the shoulder of the occupant. Since the D-ring must be placed above the occupant's shoulder to facilitate positioning a portion of the belt to cross the occupant's torso, this results in the loading of a substantial length of seat belt webbing during an emergency situation, such as a frontal crash. Webbing on both sides of the D-ring is under load, that is, the portion extending across the torso of the occupant and that extending downwardly from the D-ring into the retractor. Since retractors normally used are of the type that lock in the emergency situation, both portions of the belt are under load. The belts are not rigid members, and consequently a certain amount of stretch takes place under this loading condition. It is a design goal of automotive occupant restraint systems to optimize the restraining force applied to an occupant during emergency situations. Since belt stretch can be deleterious to ideal occupant restraint, control of seat belt webbing stretch is advantageous.

Some attention has been given in the design of seat belt retractors to the belt stretch phenomenon, and this has resulted in the provision of a certain class of seat belt retractors which respond to the imposition of emergency loading conditions by clamping the belt at the retractor, which has the effect of reducing the stretch occasioned by tension tending to pull the belt in the protracting direction from its take-up reel.

Fohl U.S. Pat. Nos. 4,485,985 and 4,717,088, are exemplary of such belt clamping retractors. These devices, however, do not deal in any manner with the stretch that will occur in a three-point seat belt system between the retractor, the D-ring, and the occupant. These devices also suffer from mechanical deficiencies which prevent the transfer of their belt clamping function to the D-ring environment. First, they necessitate the use of a pair of opposed clamping surfaces for engaging both sides of the belt. Second, they are rather complex and unwieldly positioned to substitute functionally for a body mounted D-ring.

SUMMARY OF THE INVENTION

Responsive to the deficiencies of the prior art, it is an object of the present invention to provide a guide ring for controlling the direction of protracting and retracting movement of the seat belt in a three-point automotive seat belt system which includes a rotatably supported cylindrical roller having an outer surface with a high coefficient of sliding friction for receiving one side of the seat belt and normally rotating to permit movement of the seat belt about its outer surface but including means responsive to the imposition of a Predetermined force in the seat belt to stop rotation of the roller and to effect frictional resistance between the roller and the seat belt to prevent further protracting movement. This stopping of the protracting movement of the belt results in a smaller length of seat belt webbing being under load from the occupant. Accordingly, a smaller amount of seat belt stretch results from the loading by the occupant in an emergency situation. In terms of occupant kinematics, this results in utilizing the restraining force of the seat belt system at an earlier time than would otherwise be Possible.

According to one feature of the present invention, the guide ring roller is rotatably supported on a support member to which it is held fast in response to the imposition of a predetermined force.

According to another feature of the present invention, a radial spring is operatively disposed between the roller and the support member to maintain the roller in a free rolling position in non-emergency conditions and to permit locking engagement between the roller and the support member upon the imposition of the predetermined force.

According to yet another feature of the present feature of the present invention, the locking engagement between the roller and the support member, is effected through a spindle member lockingly engageable with a toothed inner diameter of the roller member which is positioned radially outwardly from it.

According to still another feature of the invention, an alternative mechanism for effecting the locking engagement of the roller and the support member is provided which includes another layer having a high coefficient of sliding friction interposed between the outer roller member and a cylindrical surface provided on a spindle member so that locking frictional engagement can be established therebetween.

BRIEF DESCRIPTION OF THE DRAWINGS

These and other objects and features of the present invention will be apparent to those skilled in the automotive occupant restraint arts upon reading the following description with reference to the accompanying drawings in which.

DESCRIPTION OF THE PREFERRED EMBODIMENTS

Figure 1:
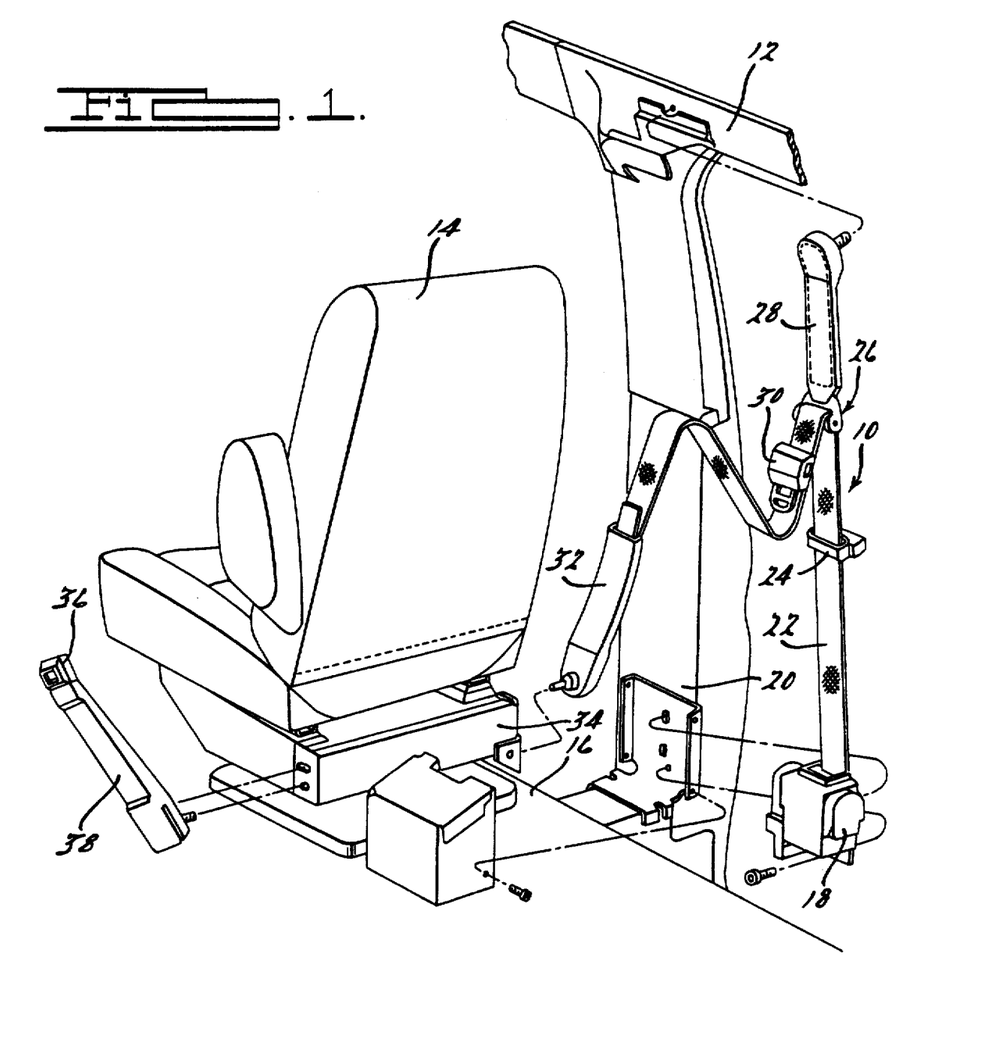
FIG. 1 is a perspective of an exploded view of an automotive seat belt system employing the locking frictional D-ring of the present invention.

Turning now to the drawings and in particular to FIG. 1 thereof, an automotive seat belt system is indicated generally at 10. It is illustrated as it is installed in an automotive vehicle having a body 12 surrounding occupant receiving seats 14 (one shown). The seats 14 are mounted in known fashion to portions of the body 12, such as the floor portion indicated at 16 and the seat belt system 10 is assembled to the body 12 in a fashion providing its use for restraining an occupant of the seat 14. The seat belt system 10 includes a retractor 18 which is fixed to a lower portion of the body 12, such as a pillar 20. The retractor 18 includes a spring-loaded spool and lock-up mechanism of a type well-known to those skilled in the occupant restraint arts. In the preferred embodiment illustrated, it is contemplated that the retractor 18 would include a return spring for biasing seat belt webbing 22 to a position in which a large portion of the webbing 22 is stored on a spool carried with the retractor 18. The retractor 18 would also include a known lock-up mechanism for stopping rotation of the take-up spool in response to some input indicative of an emergency situation, such as a deceleration above a predetermined level.

The seat belt webbing 22 extends upwardly from the retractor 18 and may pass through a fixed guide slot, such as indicated at 24, into and over the frictional D-ring 26 of the present invention. The D-ring 26 is preferably pivotably secured to the automotive vehicle body 12 as through the sling indicated at 28 but may be directly pivotally carried on the body 12. A conventional belt catchor tongue 30 is carried on the seat belt webbing 22 on the side of the D-ring 26 distal the retractor 18 in a conventional fashion, and the webbing 22 terminates in an anchor structure 32 by which it is pivotally secured to one side of the base 34 of the seat 14. A conventional seat belt buckle 36 is pivotally mounted through a boot 38 to the other side of the base 34 of the seat 14, and it is configured to lockingly receive the tongue 30.

This assembly described and illustrated in FIG. 1 is representative of 3-point occupant restraint systems commonly used in the automotive industry. An occupant of the seat 14 moves the tongue 30 from the position shown across the occupant's torso to a point of engagement with the buckle 36. The portion of the seat belt webbing 22 between the D-ring 26 and the tongue 30 makes up the torso belt portion of the seat belt system 10 while the portion of the seat belt webbing 22 between the buckle 30 and the anchor structure 32 makes up the lap belt portion of the seat belt system 10. The three essential anchor points of such a system are the anchor structure 34, the buckle mount 38 and the mounting the retractor 18 to the pillar 20. The locking frictional D-ring 26 of the present invention operates to modify the position of this third point of the system and improve its operation in certain circumstances.

Turning now to FIGS. 2–6 one preferred embodiment of the locking frictional D-ring 26 of the present invention is illustrated. The D-ring 26 consists generally of a clevis 40, a spindle 42, a sleeve 44, a roller 46 and a pair of end caps both designated as 48. The clevis 40 includes a central mounting portion 50 through which it is secured to the vehicle body 12. In the configuration shown in FIG. 2, a central through bore 52 is provided in the mounting portion 50 for pivotally mounting the clevis 40. It will be appreciated, however, that the pivotal mounting may be effected through structures such as the sling 28 shown in FIG. 1 or the structure may in fact be permitted pivotal freedom at more than one location. The clevis 40 further includes a pair of spaced mounting ears 54, each having an aligned square aperture 56 formed through it for receiving the spindle 42 which is illustrated as being formed as an elongated bar of square cross-section.

Figure 5:
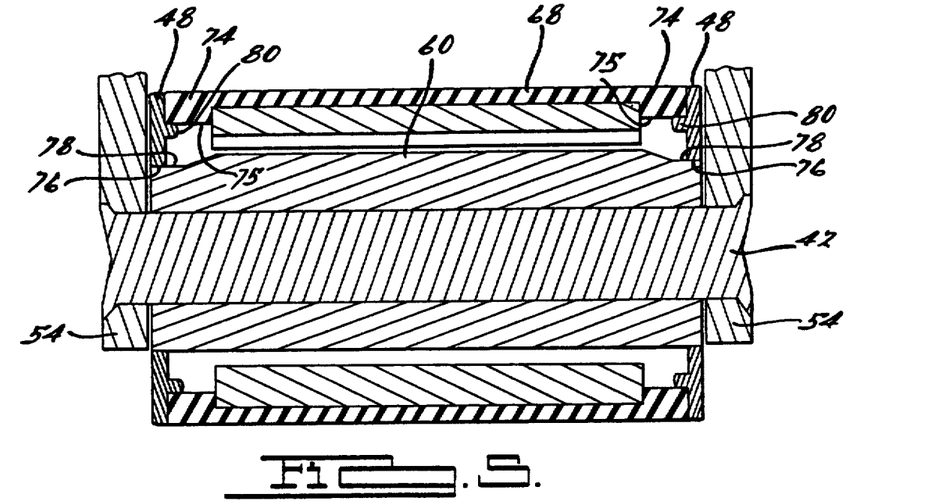
FIG. 5 is a cross-sectional view in a plane perpendicular to that of FIG. 3 illustrating the parts of the locking frictional D-ring of the present invention in the free position.
Figure 6:
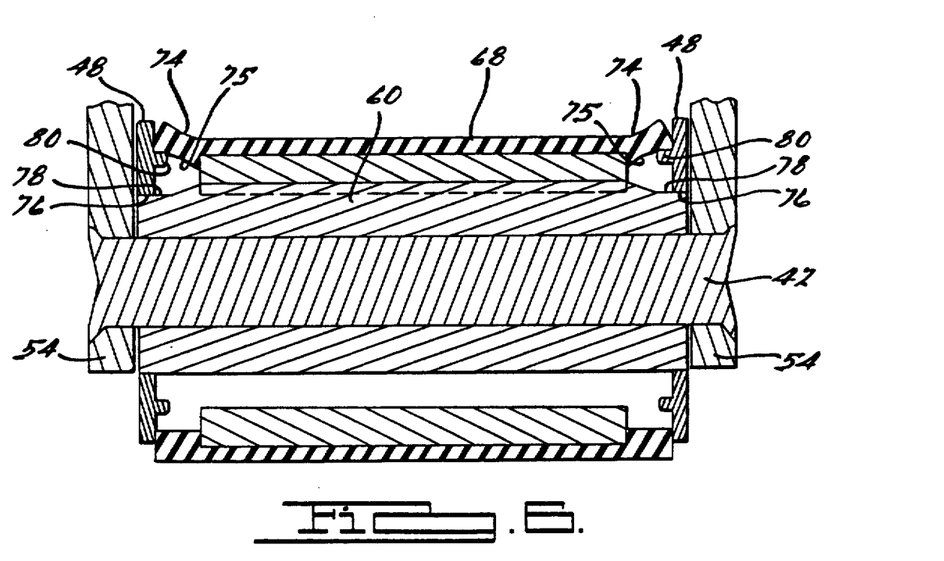
FIG. 6 is a view similar to FIG. 5 showing the parts in the locked position.
Figure 7:
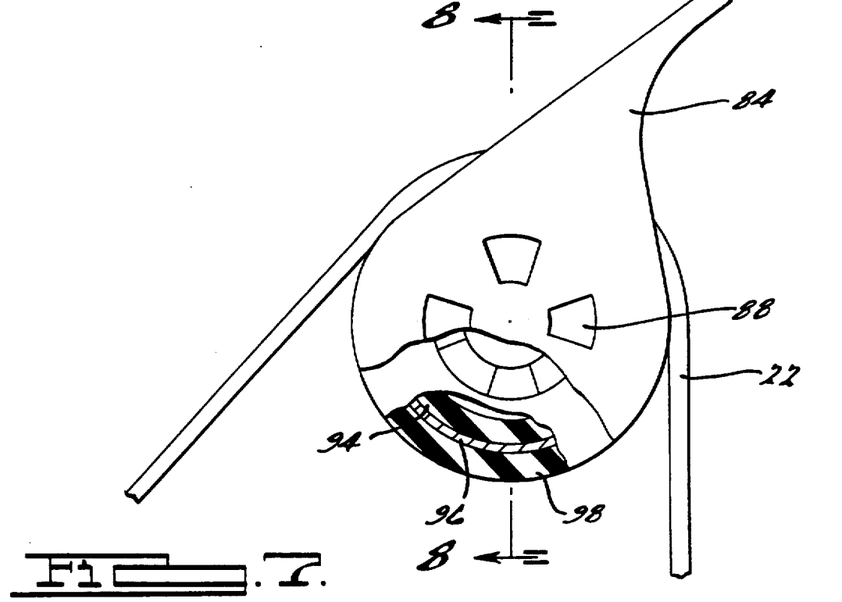
FIG. 7 is a side view partially broken away for clarity of another embodiment of the frictional locking D-ring of the present invention.
Figure 8:
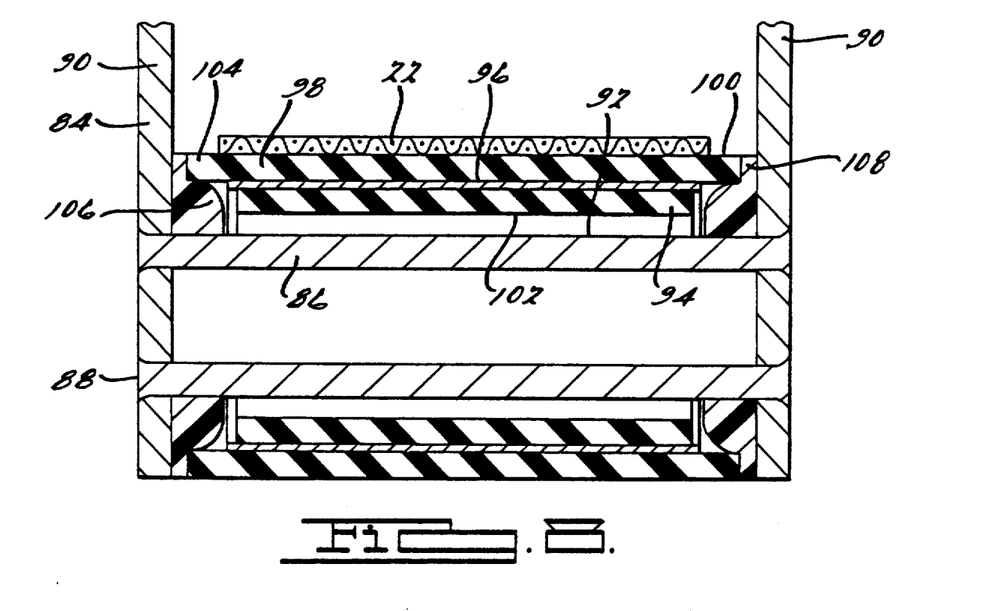
FIG. 8 is a cross-sectional view taken along line 8—8 of FIG. 7.
Figure 9:
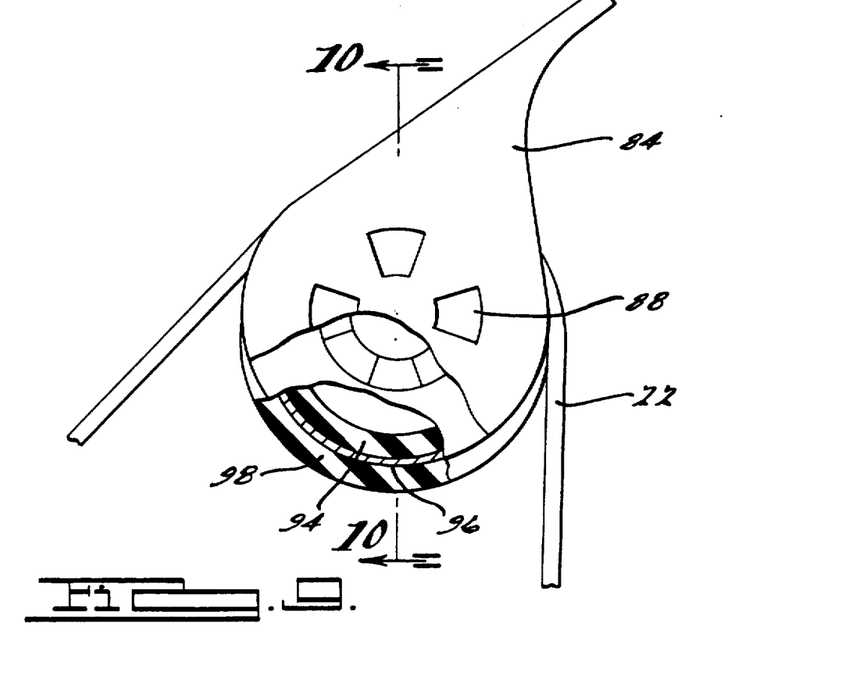
FIG. 9 is a view similar to FIG. 7 showing the FIG. 7 embodiment of the frictional locking D-ring of the present invention in the locked condition.
Figure 10:
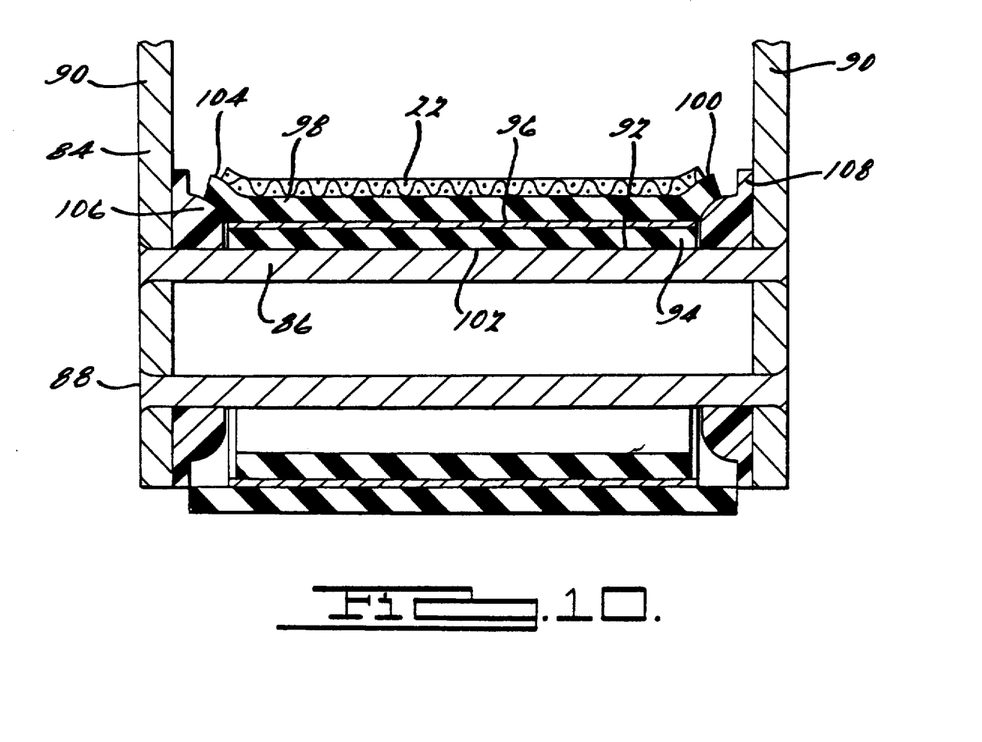
FIG. 10 is a cross-sectional view taken along lines 10-10 of FIG. 9.

The sleeve 44 is formed as an elongated generally cylindrical member having an axially extending through aperture 58 of square cross-section for receiving the spindle 42 and having a radially outwardly projecting tooth 60 formed on its outer surface 62, as may best be seen in FIGS. 5 and 6.

The roller 46 includes a generally cylindrical inner member 64 having a toothed inner diameter having a circumferentially arrayed plurality of teeth 66 for receiving the tooth 60 of sleeve 44. The roller further includes a generally cylindrical outer member 68 which is preferably formed as a flexible coating having a high coefficient of sliding friction at its outer surface 70 and formed to encapsulate the outer surface 72 of the inner member 64. Spring extensions 74 extend from each end of the roller 46 as may best be seen in FIGS. 5 and 6.

Figure 2:
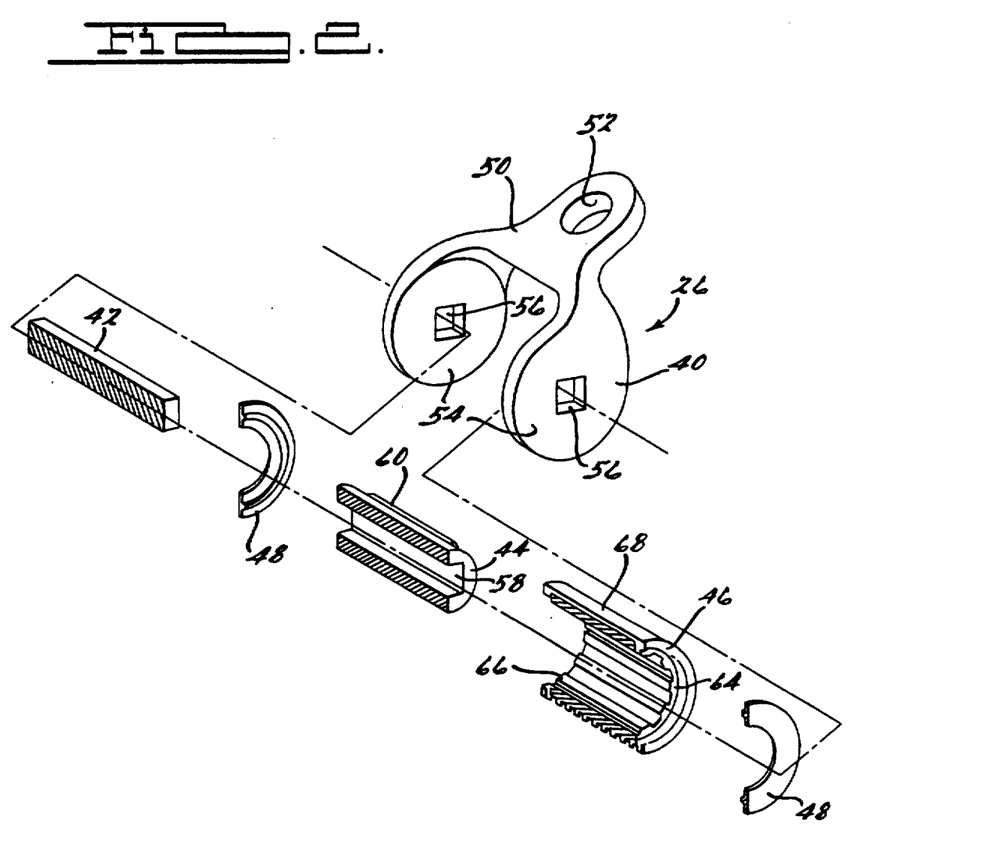
FIG. 2 is an exploded, sectioned perspective view of one preferred embodiment of the locking frictional D-ring of the present invention.

The end caps 48 are preferably formed as dish-shaped plastic members having an inner diameter 76 sized to receive diametral end portions 78 of the outer surface 62 of the sleeve 44 spaced axially outwardly from the tooth 60. Each end cap 48 also has an inwardly projecting annular support race 80 for supporting an inner diameter 75 of spring extensions 74.

Figure 3:
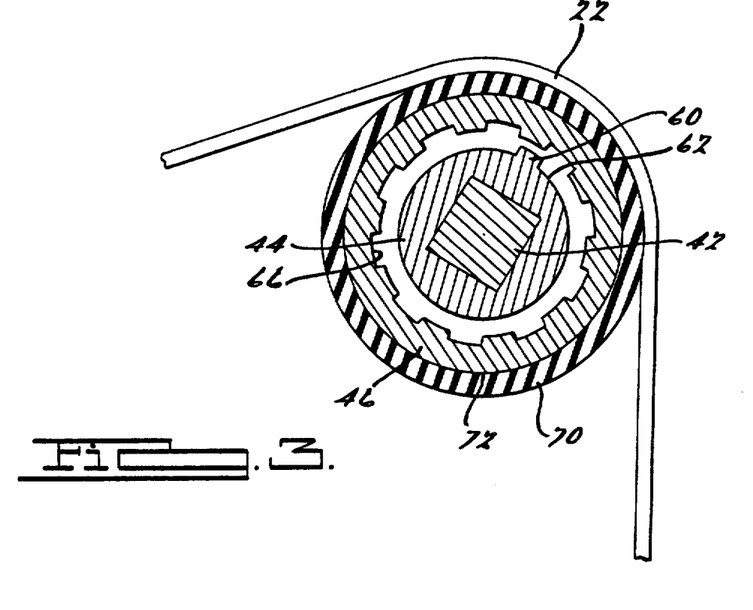
FIG. 3 is a longitudinal sectional view of the frictional locking D-ring of the present invention with its parts in a free running condition.
Figure 4:
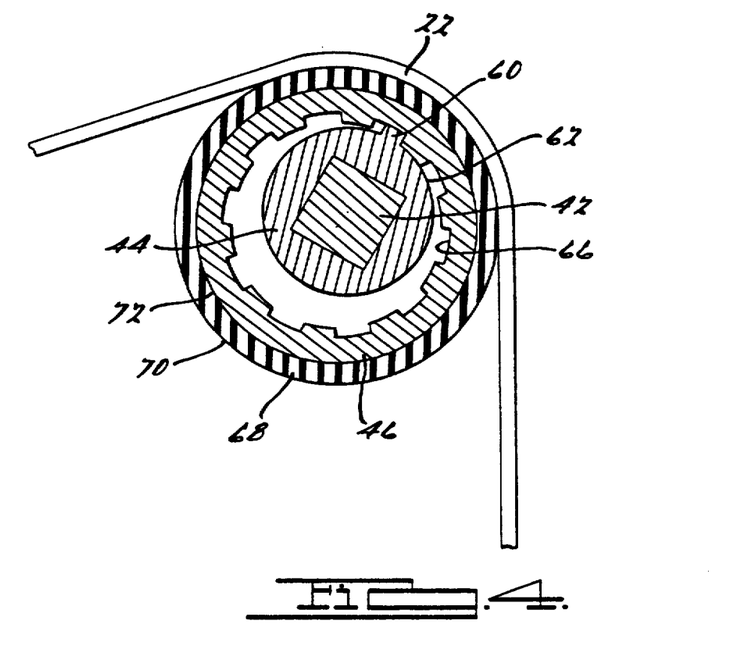
FIG. 4 is a view similar to FIG. 3 with the parts in the locked condition.

Turning now to FIGS. 5 and 6, the operation of the D-ring 26 of the present invention can be readily appreciated. In normal non-emergency operation of the seat belt system 10, the roller 46 is journalled between the support arms 54 of the clevis 40 and rotatably supported by the end caps 48 through their projections 80. This maintains the roller 46 in spaced relationship with respect to the sleeve 44 mounted on the spindle 42 as shown in FIGS. 3 and 5. The tooth 60 is positioned out of radial engagement with any of the teeth 66 internally formed on the roller inner member 64. Since the flexible outer coating of outer member 68 of the roller 46 may be formed of many very flexible materials, such as neoprene, as long as it presents at its outer surface as indicated at 70, a surface having a high coefficient of sliding friction on the order of 0.9 to 1.0 spring extension 74 may be deflected as shown in FIG. 4 to effect relative movement between the roller 46 and the spindle 42 so that engagement between the tooth 60 of the sleeve 44 and the tooth 66 of the roller inner member 64 be effected as shown in FIG. 6. When this engagement occurs, no free rotation of the roller 46 with respect to the spindle 42 is possible, and the frictional engagement between the outer surface 70 of the roller 46 and the seat belt webbing 22 operates to hold the seat belt webbing 22 against protraction at the D-ring 26. The deflection of the spring extension 74 will occur when an emergency situation exists in which a load imposed by the occupant against the seat belt webbing 22 in a protracting direction exceeds a predetermined magnitude necessary to effect that deflection. The choice of that material and the cross-sectional configuration of the spring extension 74 may be empirically derived to ensure that the movement of the roller 46 into the locked up condition of FIG. 6 occurs quickly enough to effect restraint of forward movement of the occupant by a portion of the seat belt 22 between the D-ring 26 and the occupant.

Turning now to FIGS. 7-10, an alternative embodiment of the D-ring 26 of the present invention is illustrated in which lock-up between the roller and the spindle or clevis is effected in a different manner. The essential difference between the embodiment of FIGS. 7-10 and the embodiment of FIGS. 2-6 is that the clevis 84 is configured to receive a tubular spindle 86 having end portions 88 staked into fixed engagement with the mounting ears 90 of the clevis 84. A smooth outer surface 92 is provided on the spindle 86 and an inner coating layer 94 is provided on the inner roller member 96 in addition to the outer coating layer 98 essentially identical to that of the member 74 of the embodiment of FIGS. 2-6. Outer and inner gripping surfaces 100, 102, respectively, are provided on the coating layers 94, 98 so that sliding frictional engagement is effected both between the seat belt 22 and the outer coating layer 98 and between the outer surface 92 of the spindle 86 and the inner coating layer 94, as may best be seen in FIG. 10. The mechanism for effecting displacement which permits this frictional engagement is essentially identical to that of the FIGS. 2-6 embodiment in that spring extension members 104 are normally carried for free running engagement on projections 106 of end caps 108, and the imposition of a predetermined protracting load on the seat belt 22 produces bending deflection of the spring extension members 104 into the frictionally locking engaging position shown.

While only two embodiments of the locking frictional D-ring of the present invention have been shown, others may be possible without departing from the scope of the appended claims.

I claim:

1. In an occupant restraint system for an automotive vehicle having a seat belt operatively carried with a retractor assembly to permit protracting movement to the seat belt toward an occupant of the vehicle for restraining the occupant and retracting movement toward the retractor for storage, a guide ring for controlling the direction of protracting and retracting movement of the seat belt comprising:
   a support member mounted on the body of the automotive vehicle remote from the retractor assembly;
   a substantially cylindrical roller rotatably mounted on the support member and having radially outer surfaces guidingly receiving only one side of the seat belt;
   a first coating layer having a high coefficient of sliding friction fixedly secured to the roller outer surfaces; and
   means earned within the roller responsive to the imposition of a predetermined force on the seat belt to substantially prevent rotation of the roller with respect to the support member, thereby effecting frictional resistance between the roller coating layer and the one side of the seat belt to prevent further protracting movement of the seat belt.

2. A guide ring as defined in claim 1 wherein the means to prevent rotation of the roller comprises a radial spring operatively disposed between the roller and the support member.

3. A guide ring as defined in claim 2, wherein the radial spring is formed integrally with the roller member first coating layer.

4. A guide ring as defined in claim 1, wherein the roller comprises an elongated inner spindle member fixedly secured to the support member and a cylindrical outer member having an inner diameter receiving the spindle member.

5. A guide ring as defined in claim 4 wherein the means to prevent rotation of the roller comprises:
   means defining a toothed inner diameter of the cylindrical outer member;
   means defining at least one tooth projecting radially outwardly from the spindle member and lockingly engageable with the outer member toothed inner diameter; and
   a radial spring interposed between the spindle member and the outer member to maintain radial spacing therebetween in the absence of the imposition of the predetermined force.

6. A guide ring as defined in claim 5, wherein the radial spring is formed integrally with the roller member first coating layer.

7. A guide ring as defined in claim 4 wherein the means to prevent rotation of the roller comprises:
   a second coating layer having a high coefficient of sliding friction fixedly secured to the outer member inner diameter;
   means defining a cylindrical surface on the spindle member in juxtaposition with the second coating layer; and
   a radial spring interposed between the spindle member and the outer member to maintain radial spacing therebetween in the absence of the imposition of the predetermined force.

8. A guide ring as defined in claim 7, wherein the radial spring is formed integrally with one of the roller member coating layers.

9. In an occupant restraint system for an automotive vehicle having a seat belt operatively carried with a retractor assembly to permit protracting movement to the seat belt toward an occupant of the vehicle for restraining the occupant and retracting movement toward the retractor for storage, a guide ring for controlling the direction of protracting and retracting movement of the seat belt comprising:
   a clevis pivotally mounted on the body of the automotive vehicle remote from the retractor assembly and having a pair of spaced, upstanding mounting ears;
   a non-circular spindle member having opposed ends fixedly secured to the mounting ears;
   a sleeve having an axially extending non-circular aperture for drivingly receiving the spindle member and having at least one radially extending tooth projecting therefrom;
   a substantially cylindrical roller having a toothed inner diameter receiving the sleeve for lockingly engaging the radially extending sleeve tooth and having radially outer surfaces guidingly receiving one side of the seat belt:

a pair of annular spacers having axially inwardly extending portions and mounted proximate opposed ends of the sleeve and rotatably supporting the roller with respect to the spindle; and a first coating layer having a high coefficient of sliding friction fixedly secured to the roller outer surfaces and having spring portions extending axially outwardly beyond opposed ends of the roller abuttingly engageable with the axially inwardly extending portions of the spacers, the spring portions being operative in response to the imposition of a predetermined force on the seat belt to deflect to permit radial movement of the roller with respect to the sleeve, effecting locking engagement between the roller toothed inner diameter and the the sleeve tooth to substantially prevent rotation of the roller with respect to the clevis thereby effecting frictional resistance between the roller coating layer and the one side of the seat belt to prevent further protracting movement of the seat belt.

10. A guide ring as defined in claim 9 wherein the spacers are positioned intermediate the mounting ears and the roller coating layer.

11. In an occupant restraint system for an automotive vehicle having a seat belt operatively carried with a retractor assembly to permit protracting movement to the seat belt toward an occupant of the vehicle for restraining the occupant and retracting movement toward the retractor for storage, a guide ring for controlling the direction of protracting and retracting movement of the seat belt comprising:

a clevis pivotally mounted on the body of the automotive vehicle remote from the retractor assembly and having a pair of spaced, upstanding mounting ears;

a non-circular spindle member having opposed ends fixedly secured to the mounting ears;

a sleeve having an axially extending non-circular aperture for drivingly receiving the spindle member and having at least one radially extending tooth projecting therefrom;

a substantially cylindrical roller having a toothed inner diameter receiving the sleeve for lockingly engaging the radially extending sleeve tooth and having radially outer surfaces guidingly receiving one side of the seat belt;

a pair of annular spacers having axially inwardly extending portions and mounted proximate opposed ends of the sleeve and rotatably supporting the roller with respect to the spindle; and a first coating layer having a high coefficient of sliding friction fixedly secured to the roller outer surfaces and having spring portions extending axially outwardly beYond opposed ends of the roller abuttingly engageable with the axially inwardly extending portions of the spacers, the spring portions being operative in response to the imposition of a predetermined force on the seat belt to deflect to permit radial movement of the roller with respect to the sleeve, effecting locking engagement between the roller toothed inner diameter and the the sleeve tooth to substantially prevent rotation of the roller with respect to the clevis thereby effecting frictional resistance between the roller coating layer and the one side of the seat belt to prevent further protracting movement of the seat belt.

* * * * *